United States Patent [19]

Thorndyke

[11] Patent Number: 5,409,251
[45] Date of Patent: Apr. 25, 1995

[54] LANDING GEAR ASSEMBLY

[76] Inventor: Robert J. Thorndyke, 846 Fernhill Boulevard, Oshawa, Ontario, Canada, L1J 5K4

[21] Appl. No.: 268,939
[22] Filed: Jun. 30, 1994
[51] Int. Cl.⁶ ............................................. B60S 9/02
[52] U.S. Cl. ................................. 280/475; 280/763.1; 280/766.1
[58] Field of Search .............. 280/763.1, 765.1, 766.1, 280/475, 427, 429, 431

[56] References Cited

U.S. PATENT DOCUMENTS

| | | | |
|---|---|---|---|
| 2,572,410 | 10/1951 | Van Doorne | 280/763.1 |
| 3,874,696 | 4/1975 | Gardner et al. | 280/475 X |
| 3,904,224 | 9/1975 | Belke | 280/763.1 |
| 4,097,840 | 6/1978 | Chappelle | 280/423.1 X |
| 4,150,840 | 4/1979 | Banerjea et al. | 280/429 |
| 4,711,464 | 12/1987 | Bilas | 280/766.1 |
| 4,806,065 | 2/1989 | Holt et al. | 280/425.2 X |
| 4,903,977 | 2/1990 | Baxter | 280/763.1 X |
| 5,188,379 | 2/1993 | Krause et al. | 280/763.1 X |
| 5,299,829 | 4/1994 | Rivers, Jr. et al. | 280/766.1 |
| 5,340,143 | 8/1994 | Williams, Jr. | 280/763.1 X |

FOREIGN PATENT DOCUMENTS

| | | | |
|---|---|---|---|
| 0195282 | 9/1986 | European Pat. Off. | 280/475 |
| 1087458A | 4/1984 | U.S.S.R. | |
| 1583319 | 8/1990 | U.S.S.R. | 280/475 |
| 1599252 | 10/1990 | U.S.S.R. | 280/475 |

Primary Examiner—Margaret A. Focarino
Assistant Examiner—F. Zeender
Attorney, Agent, or Firm—Richard Litman

[57] ABSTRACT

A landing gear assembly for use in supporting a semitrailer basically includes a main body and a leg axially extensible from the main body. An expansible membrane disposed within the main body is provided for displacing the leg to an extended position. A restrictive passage through the main body limits the travel of the leg through the main body. Upon compressing the expansible membrane, a biasing element disposed within the main body is provided for urging the leg back to a retracted position. The leg may be releasably secured in either an extended or retracted position.

7 Claims, 3 Drawing Sheets

LANDING GEAR ASSEMBLY

BACKGROUND OF THE INVENTION

1. Field of the Invention

The present invention relates to a landing gear assembly for use in supporting a trailer and more particularly, to an air actuated landing gear assembly for use in supporting a semitrailer.

2. Description of the Prior Art

Landing gear assemblies for supporting semitrailers typically include axially or radially displaceable legs. These assemblies are often gear driven assemblies actuated by crank mechanisms. A landing gear is not intended to elevate a semitrailer but is intended to sustain a semitrailer in an elevated posture.

Land gear assemblies for supporting semitrailers are well known. For example, U.S. Pat. No. 3,874,696, issued Apr. 1, 1975 to Clifford C. Gardner et al., discloses a support for semitrailers. The support includes a pair of adjustable legs which are pivotally displaceable between raised and lowered positions. An air cylinder effects displacement of the pair of legs.

Another landing gear assembly for use in supporting semitrailers is disclosed in U.S. Pat. No. 4,097,840, issued to Warner A. Chappelle on Jun. 27, 1978. The assembly includes landing gear operated by an electrical motor. Electrical circuitry is provided for controlling the extension and retraction of the landing gear from the cab of the tractor.

U.S. Pat. No. 4,150,840, issued Apr. 24, 1979 to Tara N. Banerjea et al., discloses a trailer having an undercarriage assembly including feet which are automatically retracted by mechanical linkages upon coupling a tractor to the trailer.

None of the above inventions and patents, taken either singly or in combination, is seen to describe the instant invention as claimed.

SUMMARY OF THE INVENTION

The present invention relates to a landing gear assembly for use in supporting a semitrailer. The assembly includes a main body and a leg axially extensible from the main body. An expansible membrane disposed within the main body is provided for displacing the leg to an extended position. A restrictive passage limits the travel of the leg relative to the main body. A biasing element disposed within the main body is provided for urging the leg back to a retracted position upon collapse of the expansible membrane. The leg may be releasably secured in an extended or retracted position.

The landing gear assembly is mounted to the gusset of a semitrailer. The mounting bracket extends the length of the main body and has a mounting surface which lies in a plane substantially tangential to the main body. The main body, the expansible membrane, the biasing element, and the leg are arranged along a common axis. Hence, upon expansion, the expansible membrane urges the leg against the force of the spring to an extending position. Upon collapse of the expansible membrane, the biasing element not only biases the leg towards a retracted position but also encourages the expansible membrane to return to a compressed or compact position.

The axial arrangement of components further provides a compact structure. Not only is the structure of the assembly compact, but the axial displacement of the leg, in contrast to legs which are arcuately displaceable, requires less operating space.

The main body preferably has an open upper end which provides access to the components contained within the main body, i.e., the expansible membrane, the leg, and the biasing element, to enable the components to be serviced and/or replaced when needed or desired. The upper opening may be easily covered with a closure plate. This plate protects the components within the main body against elements of the environment.

Moreover, the closure plate simultaneously functions as a mounting plate engageable with the underbody of the semitrailer. The mounting plate distributes force from the assembly componentry to the semitrailer floor structure. This reduces risk of damaging occurring to the floor of the semitrailer.

The mounting plate according to the present invention is preferably affixed to the expansible membrane which, in turn, is disposed adjacent the upper opening. In this way, with the main body mounted to the gusset and the mounting plate secured to the I-beam, the expansible membrane is retained in axial alignment with the main body, leg, and biasing element.

Although an end of the leg is provided with a foot or pad which is engageable with a supporting surface or terrain, the present invention is not limited to this specific structure but may include alternative structure, such as a roller or caster assembly.

Accordingly, it is a principal object of the invention to provide a landing gear assembly for use in supporting a semitrailer and more particularly, to provide an air actuated landing gear assembly for use in supporting a semitrailer.

It is another object that the assembly include an arrangement of dynamic components oriented and displaceable along a common axis, thus requiring a nominal amount of space for operating the same.

It is a further object that the assembly include an expansible membrane for displacing the leg to an extended position and a biasing element for retracting the leg and encouraging the expansible membrane to return to a compressed position.

Still another object is to provides immediate access to the internal components of the assembly to enable the components to be serviced and/or replaced when needed or desired yet protect the internal components against environmental elements.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
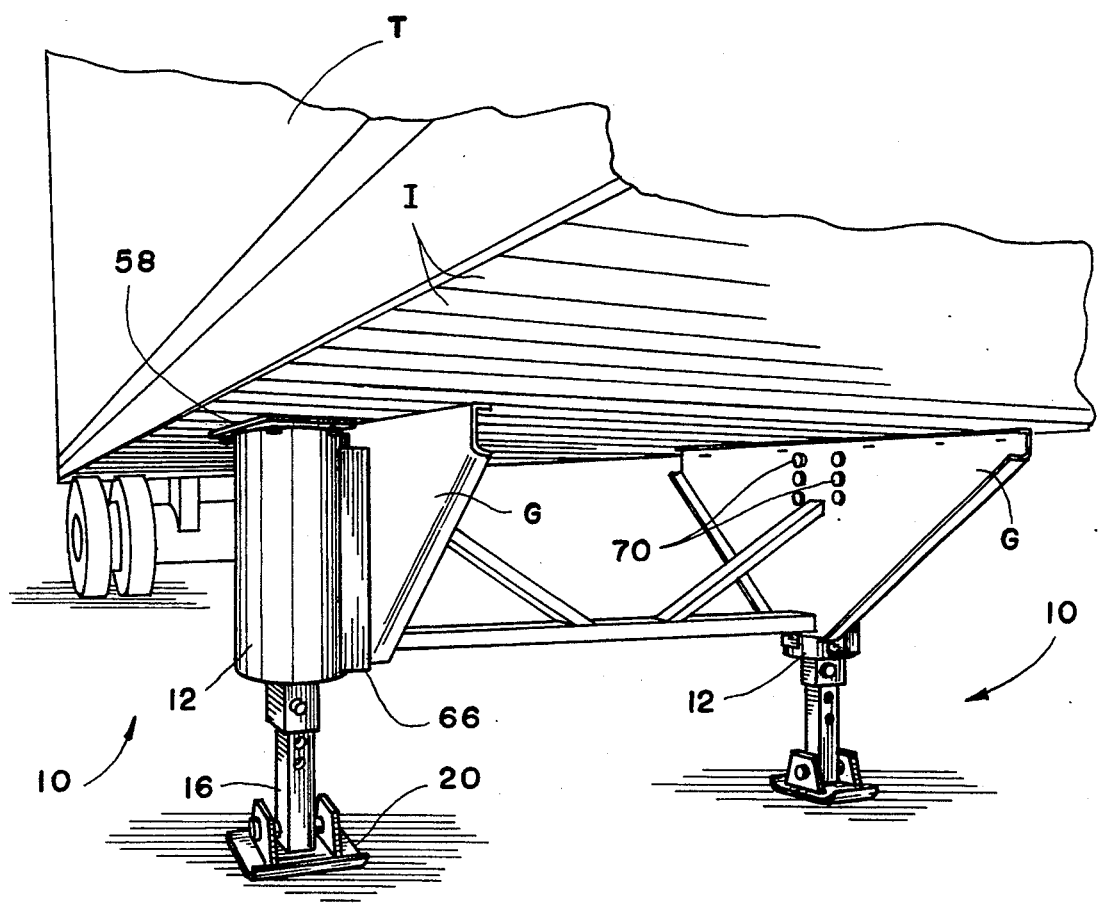
FIG. 1 is an environmental front perspective view of a landing gear assembly according to the present invention.
Figure 2:
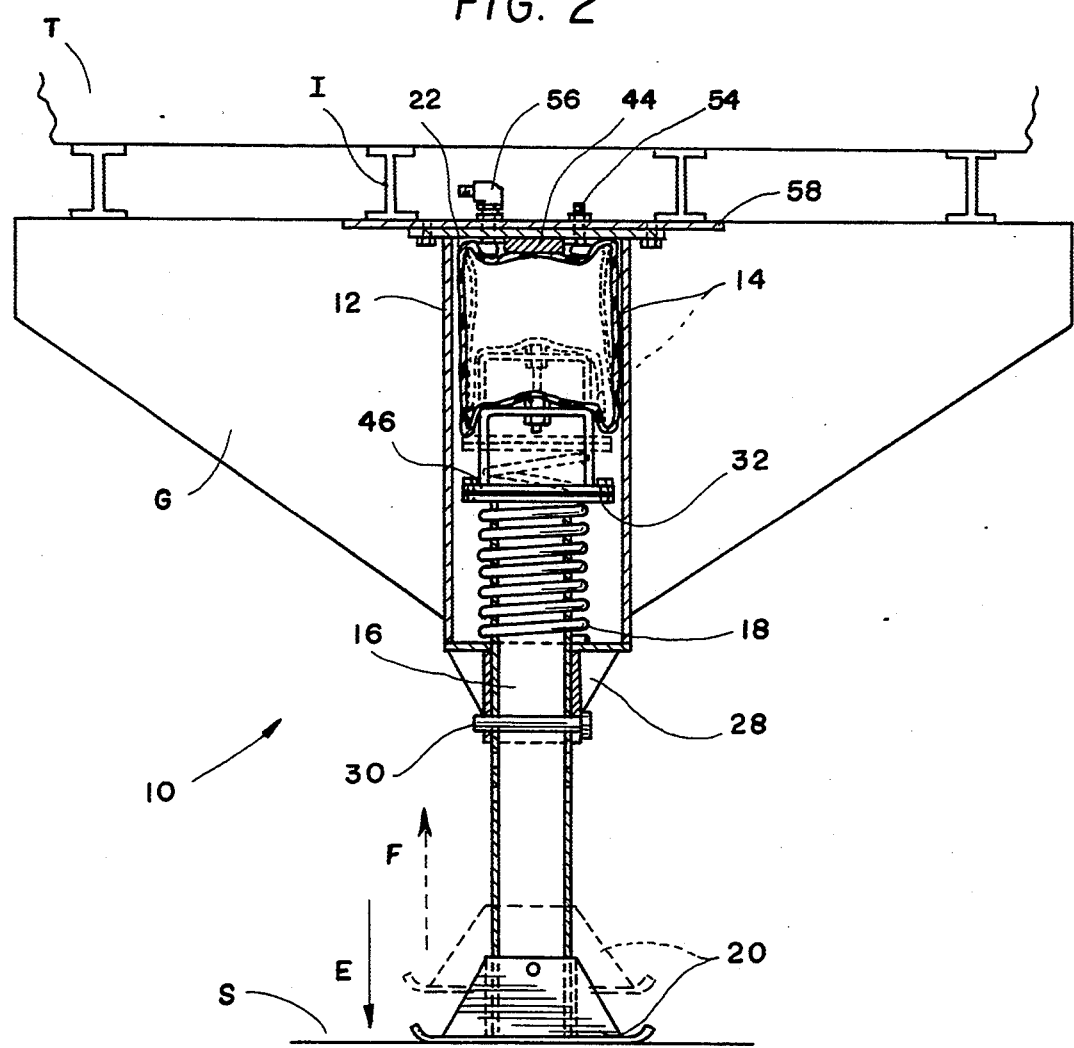
FIG. 2 is a sectional view of the landing gear assembly.

The present invention, as shown in FIGS. 1 and 2, is a landing gear assembly 10 for supporting trailers T in the absence of a tractor. The assembly 10 includes a main body 12, an air bag 14, a leg 16, a biasing element 18, and a pad 20. A pair of assemblies 10 mount to the gussets G of a trailer T. Each assembly 10 is displaceable between an expandable and retractable position. An explanation of the operation of the assembly 10 will be made clear following the detailed description.

Figure 3:
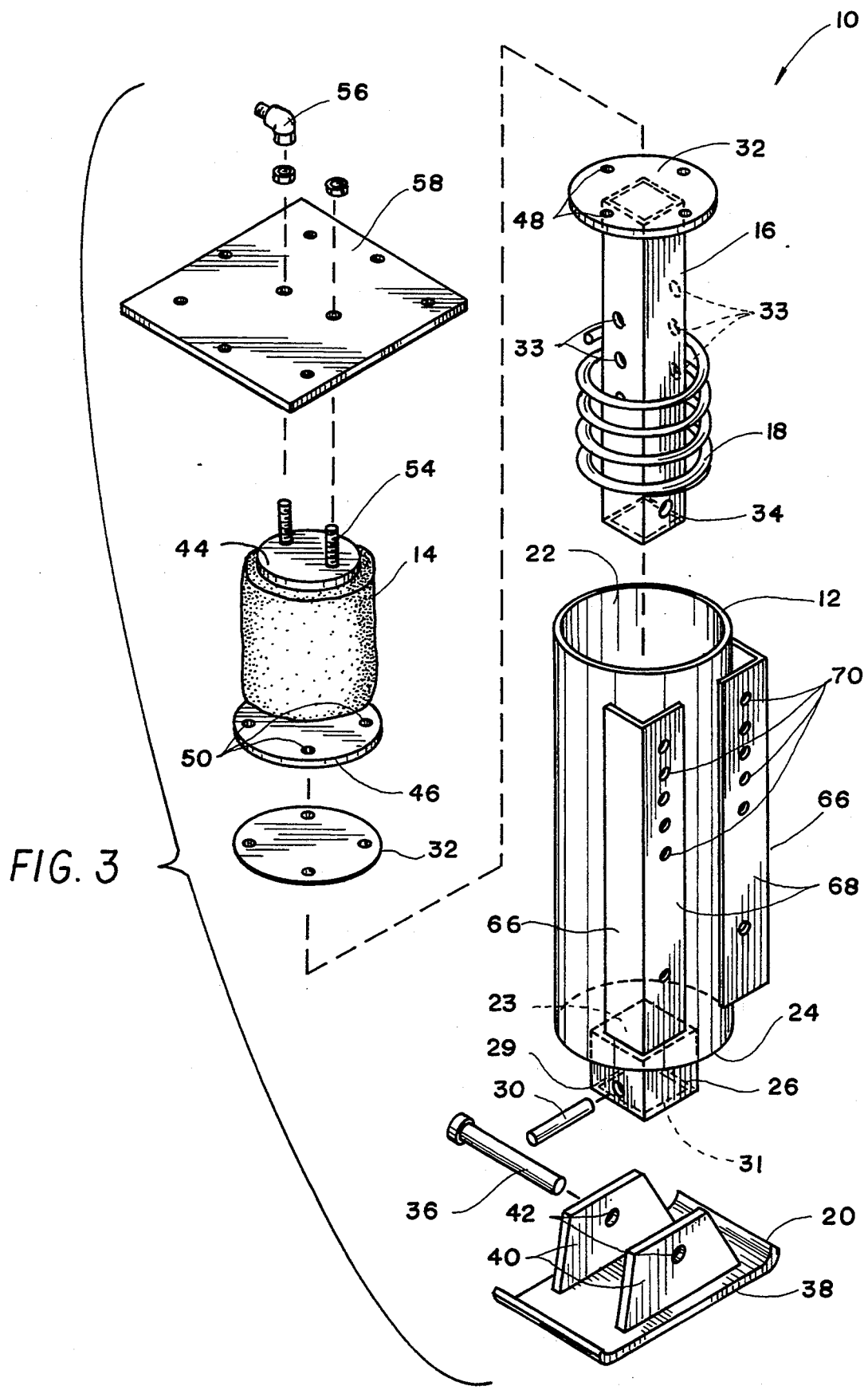
FIG. 3 is an exploded perspective view of the landing gear assembly.

Referring to FIG. 3, the main body 12 is shown to be cylindrical in shape. The main body 12 is fabricated from a strong, sturdy, rigid material. The main body 12 is dimensioned to receive the air bag 14, the leg 16, and the biasing element 18.

An upper end of the main body 12 bounds an upper opening 22. This opening 22 is large enough to receive the biasing element 18, the leg 16, and the air bag 14 therethrough. A lower end of the main body 12 has a plate 24 connected thereto. An opening 23 is centrally located in the plate 24 to permit a restrictive passage of the leg 16 therethrough.

Extending axially from the plate 24 at the lower end of the main body 12 is a sleeve 26. It should be noted that the main body 12 and the sleeve 26 are arranged on a common axis and that the sleeve 26 is in direct communication with the opening 23 in the plate 24.

A plurality of gussets 28 (shown clearly in FIG. 2) are distributed equidistantly about the sleeve 26. In accordance with the embodiment shown, the sleeve 26 is rectangular. Hence, the gussets 28 are spaced 90 degrees apart and intersect perpendicularly with the plate 24 and the sleeve 26, reenforcing the fixed structural relationship therebetween.

A hole 29 passing through the sleeve 26 is provided for receiving a safety pin 30. A safety pin 30 engages the hole 29 and one of a series of corresponding holes 33 in the leg 16 to retain the leg 16 in a desired position, as will be made clear in a discussion hereinafter of the operation of the assembly 10.

A lower end of the sleeve 26 opposite the end originating from the plate 24 defines a lower opening 31. The upper and lower openings 22, 31 and the passages through the main body 12 and sleeve 26 are arranged concentrically relative to one another.

Similar to the main body 12, the leg 16 is fabricated from a strong, sturdy, rigid material. The leg may be solid; however, it is preferable that the leg 16 be hollow to reduce material consumption in the fabrication of the same. The leg 16 is dimensioned so as to be extensible from within the main body 12 through the sleeve 26 and to a point proximate a supporting surface S, i.e., the ground or terrain (see FIG. 2).

The leg 16 is preferably configured in a shape complimentary to that of the sleeve 26 and fits closely within the sleeve 26. The leg 16 shown is rectangular in shape and slidably engages the rectangular shaped sleeve 26. In this way, the sleeve 26 functions as a guide for the leg 16 and prevents the leg 16 from twisting relative to the main body 12.

An upper end of the leg 16 has a plate 32 attached thereto. This plate 32 is preferably attached in a plane perpendicular to an axis defined by the leg 16. The plate 32 is dimensioned to fit closely within the main body 12. With the leg 16 passing through the sleeve 26, the plate 32 attached to the leg 16 lies in a plane substantially parallel to that of the plate 24 attached to the lower end of the main body 12. The plate 32 attached to the upper end of the leg 16 is larger than the opening 23 in the plate 24 attached to the lower end of the main body 12 so as to restrict the passage of the leg 16 therethrough.

As previously mentioned, an intermediate portion of the leg 16 includes a series of holes 33. These holes 33 are provided for receiving a safety pin 30. This series of holes 33 permits the leg 16 to be fixed at various positions relative to the main body 12.

The leg 16 further includes a lower end and a aperture 34 passing substantially perpendicularly through the leg 16 proximate the lower end thereof. The aperture 34 is dimensioned to receive a retainer pin 36 therethrough. The retainer pin 36 movably attaches the pad 20 to the lower end of the leg 16. Detail of this attachment configuration will become more clear with the description of the pad 20 herebelow.

The pad 20 includes a substantially planar first element or sled 38 and a pair of substantially planar, spaced elements 40 extending perpendicularly from the sled 38. The distance separating the pair of spaced elements 40 is slightly larger than cross-section of the leg 16, permitting the leg 16 to be loosely received therebetween. Each spaced element 40 has a hole 42 therethrough for snugly receiving the retainer pin 36. The holes 42 are arranged along a common axis.

To couple the leg 16 and pad 20, the leg 16 is positioned between the pair of spaced elements 40 in a manner such that the aperture 34 in the leg 16 is oriented to coalign with the corresponding holes 42 in the spaced elements 40. Subsequently, the retainer pin 36 is insertable through the coaligned aperture 34 and holes 42 to pivotally connect the pad 20 to the leg 16.

The biasing element 18, i.e., the coil spring shown, slidably engages the leg 16 and subsequently, is positioned juxtaposed an inner surface of the plate 24 at the lower end of the main body 12. More specifically, the coil spring 18 is carried by the leg 16 and situated in the main body 12 between the plate 24 connected to the lower end of the main body 12 and the plate 32 attached to the upper end of the leg 16.

Upon axial displacement of the leg 16 in a first direction E (see FIG. 2) from an initial or retracted position to an extended position, the coil spring 18 is compressed. Moreover, upon axial displacement of the leg 16 in a second direction F from the extended position back to the initial position, the coil spring 18 returns to a more relaxed state. It has been found that a coil spring ranging from 6–20 inches in length and having a maximum compression of 600 pounds is sufficient.

The displacement of the leg 16 is accomplished with an inflatable air bag 14, such as model 1R12-103 manufactured by Goodyear Tire and Rubber, of Akron, Ohio. The air bag 14 has an upper end and a lower end. The upper end has an upper plate 44 attached thereto and the lower end has a lower plate 46 attached thereto. Similar to that of the plate 32 attached to the upper end of the leg 16, the upper and lower air bag plates 44, 46 are dimensioned to fit closely within the main body 12.

The lower plate 46 of the air bag 14 is fixedly attached to the plate 32 at the upper end of the leg 16. This may be accomplished as follows. In accordance with the present invention shown, the abutting plates 32, 46 are provided with an array of mutually alignable holes 48, 50. The holes 50 in the lower plate 46 of the air bag 14 are threaded. The holes 48 in the plate 32 attached to the upper end of the leg 16 are configured to receive fasteners (not shown). The fasteners preferably seat flush within the holes 48 in the plate 32 attached to the upper end of the leg 16.

As shown in FIG. 2, the air bag 14 is oriented within the main body 12 atop the plate 32 attached to the upper end of the leg 16 and opposite the coil spring 18. The upper plate 44 of the air bag 14 is situated adjacent the upper opening 22 of the main body 12. The upper plate 44 supports a male stud 54 and a port 56. The port 56 permits fluid to flow into and out of the air bag 14. The stud 54 permits a plate or closure 58 to be affixed atop the air bag 14 and juxtaposed the main body 12.

Now, referring back to FIGS. 1 and 2, regarding the attachment of the assembly 10 to the trailer, the main body 12 is shown attached to the gusset G of the trailer T with the closure 58 attached adjacent the floor support beams or I-beams I of the trailer T. The I-beams I of the trailer T provide sufficient clearance for the male stud 54 and the port 56 of the air bag 14. Apertures are provided in the closure 58 which permit the passage of the stud 54 and port 56 therethrough. Closure 58 is dimensioned to extend beneath two adjacent I-beams I so as to spread the load from the landing gear assembly 10 to main structural members of the semitrailer T.

More specifically, with respect to attaching the main body 12 of the assembly 10 to the trailer gusset G, elongated mounting brackets 66 (shown more clearly in FIG. 3) extending the length of the main body 12 are affixed to the main body 12 in a manner such that the mounting brackets 66 are arranged parallel relative to one another. Each mounting bracket 66 includes an abutment surface 68 for abuttingly engaging a trailer gusset G. The abutting surfaces 68 are disposed in a common plane substantially tangential to the main body 12.

Each abutting surface 68 includes a series of holes 70, preferably threaded holes. Corresponding holes are provided in the trailer gusset G. Threaded fasteners 72 are threadably engageable with the threaded holes 70 to adjoin the main body 12 to the trailer gusset G. As illustrated in the drawings, a landing gear assembly 10 is adjoined to each trailer gusset G.

In operation, air is supplied to the port 56 of the air bag 14, inflating the air bag 14 and, in turn, extending or lowering the leg 16 of the landing gear assembly 10 until the pad 20 of the assembly 10 engages the supporting terrain S. The hole 29 in the sleeve 26 is brought into alignment with one of the uppermost holes 33 in the leg 16. Upon inserting the safety pin 30 through the coaligning holes 29, 33, the leg 16 is prevented from inadvertently retracting. After following this procedure, the trailer T will remain in an elevated posture without support from the tractor. In the event that the air bag 14 fails, the safety pin 30 will ensure that the leg 16 remains extended.

To retract the leg 16, with the trailer T being otherwise supported, i.e., by the tractor, the safety pin 30 is removed and the air is discharged from the air bag 14. Upon discharging the air from the air bag 14, the coil spring 18 urges the leg 16 upward, returning the leg 16 to the retracted position. In this retracted position, the safety pin 30 is insertable through a second set of corresponding holes 29, 33, retaining the leg 16 in the retracted position.

It is to be understood that the present invention is not limited to the sole embodiment described above, but encompasses any and all embodiments within the scope of the following claims.

I claim:

1. A landing gear assembly for a semitrailer having gussets, said landing gear assembly comprising:
   a main body, said main body being substantially cylindrical in shape, said main body having a lower end and an upper end, said main body having a lower opening at said lower end;
   a leg axially extensible from said main body through said lower opening, said lower opening providing a restricting passage for said leg therethrough, said main body being cooperatively engageable with said leg so as to prevent rotational displacement of said leg relative to said main body;
   a rectangular sleeve for releasably securing said leg in a fixed position relative to said main body;
   an expansible membrane disposed within said main body, said expansible membrane being disposed proximate said upper end of said main body and juxtaposed said leg;
   a biasing element disposed within said main body, said biasing element being disposed proximate said lower end of said main body and juxtaposed said expansible membrane;
   a pair of mounting brackets for attaching said landing gear assembly to a gusset of a semitrailer, said pair of mounting brackets extending substantially from said lower end of said main body to said upper end of said main body, said pair of mounting brackets including a mounting surface on each bracket, said mounting surface lying in a plane substantially tangential to said main body; and
   including a mounting plate, said main body having an upper opening at said upper end, said mounting plate enclosing said upper opening, said mounting plate being attachable to said semitrailer.

2. The assembly according to claim 1, wherein said expansible membrane includes an inflatable bag, said inflatable bag being arranged substantially in axial alignment with said leg, said inflatable bag being attachable to said leg.

3. The assembly according to claim 1, wherein said biasing element includes a coil spring, said coil spring being carried by said leg, said coil spring having opposing ends, a lower one of said opposing ends being engageable with said main body, an upper one of said opposite ends being engageable with said leg, said coil spring being biasable against said expansible membrane.

4. The assembly according to claim 1, further including a pad, said leg having an exposed end, said pad being pivotally attachable to said exposed end of said leg.

5. The assembly according to claim 1, wherein said rectangular sleeve is in direct communication with the lower opening at said lower end of said main body and contains a hole for receiving a safety pin which engages one of a series of corresponding holes in the leg to retain the leg in one position.

6. The assembly according to claim 5, wherein said leg is retained in an retracted position by the safety pin engaging one of said corresponding holes in said leg.

7. The assembly according to claim 1, wherein said leg is selected from a solid leg and a hollow leg.

* * * * *